No. 813,914. PATENTED FEB. 27, 1906.
R. H. RENDAHL.
WIRELESS ELECTRIC SIGNALING SYSTEM.
APPLICATION FILED AUG. 19, 1905.
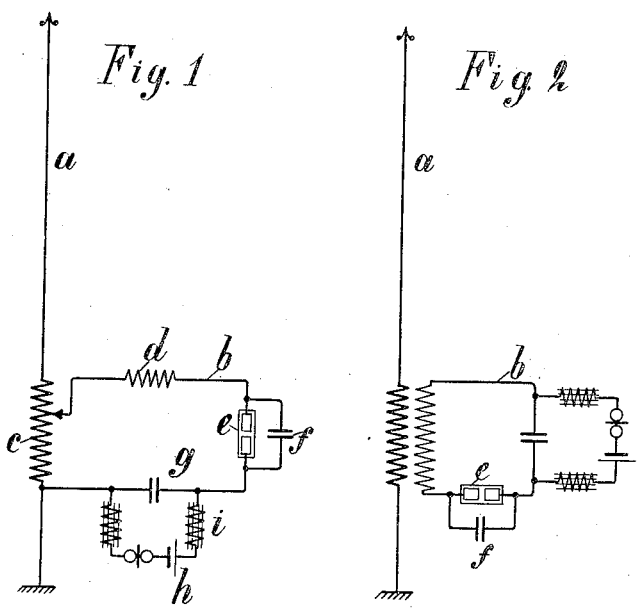

UNITED STATES PATENT OFFICE.

RAGNAR H. RENDAHL, OF BERLIN, GERMANY.

WIRELESS ELECTRIC SIGNALING SYSTEM.

No. 813,914.   Specification of Letters Patent.   Patented Feb. 27, 1906.

Application filed August 19, 1905. Serial No. 274,904.

*To all whom it may concern:*

Be it known that I, RAGNAR HAKAN RENDAHL, engineer, a subject of the King of Sweden and Norway, residing at 13 Hollmannstrasse, Berlin, S. W., Germany, have invented certain new and useful Improvements in Wireless Electric Signaling Systems, of which the following is a full, clear, and exact description, reference being had to the accompanying drawings, forming a part of this specification.

In receivers for wireless telegraphy the indicator in most cases must be inserted in a separate oscillation-circuit, the so-called "indicator-circuit," to which the receiver energy is supplied inductively or conductively utilizing resonance. The two circuits are preferably mutually tuned, that is to say they receive the same number of self-vibrations in order to have as complete a transmission of energy as possible. The traveling of energy from one circuit to the other, is, however, connected with a breaking up of waves, so that instead of the self-vibrations of the circuit, two vibrations, a rapid and a slow one, take place, which lie the farther apart the more rapid the transference of the energy is, that is to say the firmer the coupling (the electric connection) between the circuits is. This breaking up of the waves may therefore also serve as a measure or scale for the existing coupling and the proportion between the difference of the two waves produced and the natural wave is indicated by the term "degree of coupling." This breaking up of the waves in the receiver produces inexactness in the tuning of the receiver to the transmitter. This, however, had hitherto to be put up with because a diminution of the breaking up of the waves, that is to say making the coupling looser, always has as a result in the receiver a diminution of the receiving intensity. This action is mainly to be ascribed to the properties of the indicators. We differentiate between two indicators *i. e.* between those which respond to potential and which in a non-responsive condition consume no energy, and those which respond to current and which consume an amount of energy proportionate to the strength of current flowing through them. To the first class the so-called "coherer" belongs, to the second the electrolytic detector. These two indicators do not suffice for the conditions for a full utilization of the resonance if they, as was hitherto the case, lie alone with the self-induction coil in an oscillation-circuit. The coherer forms, before the calling up, a capacity. This is somewhat variable so that the number of oscillations of the indicator-circuit is not to be maintained constantly similar to that of the receiver-circuit, while the electrolytic detector consumes too large a part of the oscillation energy conveyed through it to allow of an increase of amplitude by resonance. If a condenser having a capacity several times as large as that of the indicator be connected in parallel to it, on the one hand the wave alteration produced by the variations of capacity of the coherer will be unimportant and on the other hand with the electrolytic detector the major part of the oscillation energy will be conveyed through the condenser and thus not consumed. The enlargement of the capacity of the indicator-circuit alone, however, does not attain the object sought for, because a not inconsiderable part of the oscillation energy is destroyed by ohmic resistance of the self-induction coil of the indicator-circuit. A diminution of this resistance is therefore also necessary. Now experiments have shown that when a condenser is connected in parallel to the indicator and with a sufficient diminution of the ohmic resistance of the self-induction coil and the indicator-circuit, a loosening of the coupling within certain limits has an increase of the amplitude in the indicator-circuit as a consequence, that is to say, in other words, that a pure sharp tuning of the indicator-circuit is possible without diminishing the receiver intensity in the indicator-circuit but in fact frequently increasing it. The diminution of the ohmic resistance takes place preferably by a suitable enlargement of the section of the wire used for the self-induction coil. In order to obtain practically handy dimensions and to avoid losses by eddy-currents in too thick copper wires, it is preferable to wind the self-induction coils from a many-times subdivided cord. The degree of coupling in the receiver necessary for establishing the maximum intensity is not constant, but depends partly on the damping of the arriving wave-train, partly on the damping which cannot be avoided in the receiver itself and amounts for most cases arising in practice to 0.1 to five per cent. In tuning according to the old method without a condenser parallel to the indicator and without diminished losses of resistance in the indicator-circuit, an intensity is obtained which always increases with the increasing degree of coupling of the receiver while in tuning the receiver according to the present invention the intensity first lowers with diminishing degree of coupling and then, however, again rises and attains a maximum at the given, above-mentioned, degree of coupling 0.1 to five per cent.

This invention thus affords the possibility, by indicating suitable means and proportions, of producing a substantially sharper tuning of the receiver to the arriving wave than was previously the case without diminution of the receiving intensity and thereby obtains a considerably higher degree of vibration freedom of the receiver than it hitherto possessed.

The invention will be more particularly described in connection with the accompanying drawings, in which, The receiver shown in Figure 1, is formed of an aerial conductor $a$, which is conductively but only loosely coupled with an indicator-circuit $b$. The loose coupling is here attained by only a portion of the total self-induction contained in the receiver-circuit being employed for coupling with the indicator-circuit, that is to say in other words, only a portion of the coil $c$ of the receiver-circuit acts together with the self-induction coil $d$ of the indicator-circuit. The indicator-circuit contains, in addition to this coil $d$, a coherer $e$ and the condenser $g$, which is very large and indifferent in regard to the tuning of this circuit and serves only to prevent a short-circuiting of the local circuit $i$ containing the battery $h$. The self-induction coil is by the present invention formed of a conductor of good conductivity and having a diameter of at least one millimeter. A condenser $f$ is connected in parallel to the coherer, through which condenser the capacity of the indicator-circuit is brought to at least twice the amount of the capacity of the coherer. Instead of loosely conductively coupling the indicator-circuit with the aerial conductor, the coupling may also take place inductively, as shown in Fig. 2, the loose coupling being obtained in the ordinary manner, for instance, by leaving a space between the primary and the secondary coils of the converter, or by only a smaller portion of the self-induction of the indicator-circuit, acting in conjunction with the primary coil of the aerial conductor.

Having explained my invention, what I claim, and desire to secure by Letters Patent, is—

1. A receiver arrangement for wireless electric signaling system in which a condenser is inserted in parallel to the indicator, the capacity of which condenser is at least twice as large as that of the indicator, and the damping of the indicator-circuit is so diminished by the diminution of its ohmic resistance that a diminution of the degree of coupling between the indicator-circuit and the receiver-circuit within certain limits has for a consequence an increase of the intensity in the indicator-circuit substantially as described.

2. A wireless electric signaling system in which the coupling between the indicator-circuit and the receiver-circuit is made so loose that the intensity in the indicator-circuit attains a maximum quantity with the object of obtaining a sharper tuning of the receiver-circuit with enlarged receiving capacity substantially as described.

In witness whereof I hereunto subscribe my name this 29th day of July, A. D. 1905.

RAGNAR H. RENDAHL.

Witnesses:
HENRY HASPER,
WOLDEMAR HAUPT.